United States Patent Office 2,905,683
Patented Sept. 22, 1959

2,905,683

ETHER CONTAINING ESTERS OF DITHIOPHOSPHORIC ACID AND SALTS THEREOF

Fred Corwin Goldsmith, Painesville, Ohio, assignor to The Lubrizol Corporation, Wickliffe, Ohio, a corporation of Ohio No Drawing. Application December 17, 1952
Serial No. 326,605

6 Claims. (Cl. 260—429.7)

This invention relates as indicated to ether-containing esters of dithiophosphoric acid, and salts thereof. This invention also relates to lubricating compositions which have been improved by the addition thereto of a small amount of the metal salts of organic dithiophosphate acid di-esters in which the ester groups contain at least one non-benzenoid ether linkage.

Organic phosphorus compounds have found utility as additives to improve the performance of lubricating oils. More specifically, they have been used as inhibitors to retard the oxidation of crankcase oils and to reduce the corrosion of sensitive alloy bearing surfaces. In some instances they have also been employed in lubricating oils to serve as detergents for lessening the deposition of sludge and lacquer. A further use is as extreme-pressure additives for gear oils, where high unit pressures normally tend to weld or score the surfaces of the gear teeth.

It is therefore a principal object of this invention to provide esters of dithiophosphoric acids in which the ester radicals contain at least one ether linkage, and salts thereof.

It is a further object of this invention to provide improved lubricating compositions which contain metal salts of ether-containing esters of dithiophosphoric acid.

Broadly stated this invention is directed to the metal salts of organic dithiophosphate acid di-esters, in which the ester radicals contain at least one non-benzenoid ether linkage. These new compounds can be more exactly defined by the formula:

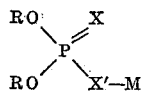

in which X and X' are sulfur, M is the hydrogen equivalent of a salt forming radical, and R is an organic radical having at least six carbon atoms and selected from the class consisting of oxygen containing aliphatic and cycloaliphatic radicals, preferably the oxygen containing aliphatic radicals.

More particularly this invention is defined as the oil-soluble metal salts of an organic dithiophosphoric acid di-ester having the formula:

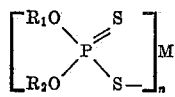

wherein $n$ represents the valency of metal M, and $R_1$ and $R_2$ are the same or different non-benzenoid organic radicles having at least 6 carbon atoms, and each of said radicles $R_1$, $R_2$ is:

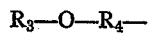

wherein $R_3$ is a monovalent non-benzenoid organic radicle, $R_4$ is a divalent aliphatic radicle, and O is an ether linkage.

Examples of ether-bearing radicles from which $R_1$ and $R_2$ can be selected are:

(1) Alkoxy-substituted alkyl radicles, e.g.:
  A. Saturated, e.g.:
Methoxy-amyl
Ethoxy-butyl
Propoxy-propyl
n-Propoxy butyl
Iso-propoxy-amyl
Butoxy-ethyl radicals, e.g.;
  n-Butoxy-ethyl
  Iso-butoxy-ethyl
  Tert-butoxy-ethyl
Octoxy-ethyl radicle
Methoxy hexyl radicle, e.g.:
  2-methoxy-hexyl
  3-methoxy-propyl hexyl
Ethoxy-amyl radicle, e.g.:
  2-ethoxy-amyl
  3-ethoxy-amyl
Propoxy-propyl radicle, e.g.:
  2-propoxy-propyl
  3-propoxy-propyl
Butoxy-propyl radicle
Octoxy-propyl radicle
Ethoxy-butyl radicle, e.g.:
  2-ethoxy-butyl
  3-ethoxy-butyl
  4-ethoxy-butyl
Propoxy-butyl
Butoxy-butyl
Octoxy-butyl
Ethoxy-octyl, e.g.:
  7-ethoxy-octyl
  8-ethoxy-octyl
Di-(ethoxy)-ethyl radicle
Di-(propoxy)-ethyl radicle, e.g.:
  Di-(n-propoxy)-ethyl
  Di-(iso-propoxy)-ethyl
Di-(butoxy)-ethyl radicle, e.g.:
  Di-(n-butoxy)-ethyl
  Di-(iso-butoxy)-ethyl
Di-(ethoxy)-propyl radicle, e.g.:
  2-3-di-(ethoxy) propyl
  3,3-di-(ethoxy)-propyl
Di-(propoxy)-propyl radicle, e.g.:
  2,3-di-(propoxy)-propyl
  3,3-di-(propoxy)-propyl
Di-(butoxy)-propyl radicle, e.g.:
  2,3-di-(butoxy)-propyl
  3,3-di-(butoxy)-propyl
Di-(ethoxy)-butyl radicles, e.g.:
  3,4-di-(ethoxy)-butyl
  4,4-di-(ethoxy)-butyl
Di-(propoxy)-butyl radicles
  B. Unsaturated, e.g.:
Ethenoxy-butyl
Propenoxy-propyl
Butenoxy-ethyl
Pentenoxy-ethyl
Hexenoxy-ethyl
Heptenoxy-ethyl
Octenoxy-ethyl
Propenoxy-propyl
Butenoxy-propyl
Octenoxy-propyl
Propenoxy-butyl
Butenoxy-butyl
Ethoxy-butenyl
Propoxy-propenyl
Butoxy-ethenyl
Octoxy-ethenyl
Ethenoxy-butenyl Propenoxy-propenyl
Butenoxy-ethenyl
Octenoxy-ethenyl
Diisobutenoxy-ethyl
Triisobutenoxy-ethyl
Bis-(diisobutenoxy) propyl
  (2) Cycloalkoxy substituted alkyl radicles, e.g.:
Cyclohexoxy-methyl
Cyclohexoxy-ethyl radicles, e.g.:
  Beta-cyclohexoxy-ethyl
  Alpha-cyclohexoxy-ethyl
Cyclohexoxy-propyl radicles, e.g.:
  2-cyclohexoxy-propyl
  3-cyclohexoxy-propyl
Cyclohexoxy-butyl radicles
Methyl cyclohexoxy-ethyl radicles, e.g.:
  o-Methyl-cyclohexoxy-propyl
  p-Methyl-cyclohexoxy propyl
Methyl-cyclohexoxy-propyl radicles
  2-(o-methyl-cyclohexoxy)-propyl
  2-(p-methyl-cyclohexoxy) propyl
Methylcyclohexoxy-butyl radicles
  4-(o-methyl-cyclohexoxy)-butyl
  4-(p-methyl-cyclohexoxy)-butyl
Ethylcyclohexoxy-ethyl radicles
Propylcyclohexoxy-ethyl radicles
Butylcyclohexoxy-ethyl radicles
Cyclopentoxy-ethyl radicles
Cyclobutoxy-ethyl radicles
Cyclopropoxy-ethyl radicles
  (3) Aliphatic polyether radicles, e.g.:
2′-butoxy-2-ethoxy-ethyl
2-ethoxy-2-ethoxy ethyl
2′-methoxy-2-ethoxy ethyl
2″-butoxy-2′-ethoxy-2-ethoxy ethyl
  (4) Inorganic containing ether radicles, e.g.:
Diisobutenoxy ethylene-dithio-ethyl, e.g.:

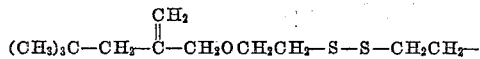

Sulfurized diisobutenoxy ethyl, e.g.:

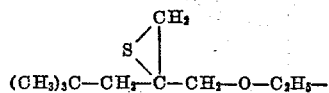

Specific examples of oil-soluble ether-containing esters of dithiophosphoric acid are:
  (1) Unsymmetrical types
2-butoxy-ethyl diisobutenoxy-ethyl dithiophosphoric acid
2-butoxy-ethyl triisobutenoxy-ethyl dithiophosphoric acid
Diisobutenoxy-ethyl triisobutenoxy-ethyl dithiophosphoric acid
2-butoxy-ethyl bis-(diisobutenoxy) - propyl dithiophosphoric acid
2-cyclohexoxy-ethyl-2-butoxy ethyl dithiophosphoric acid
Diisobutenoxy-ethyl 2-cyclohexoxy-ethyl dithiophosphoric acid
  (2) Symmetrical types
Di-(butoxy ethyl) dithiophosphoric acid
Di-(2-butoxy ethyl) dithiophosphoric acid
Di-(2-cyclohexoxy ethyl) dithiophosphoric acid
Bis-(diisobutoxy ethyl) dithiophosphoric acid
Bis-(sulfurized diisobutenoxy ethyl) dithiophosphoric acid e.g.:

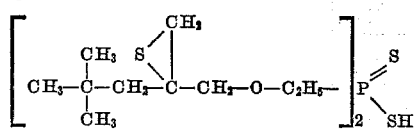

Bis-(diisobutenoxy-ethyl) dithiophosphoric acid
Bis-(triisobutenoxy-ethyl) dithiophosphoric acid
Bis-bis-(diisobutenoxy) propyl dithiophosphoric acid The oil soluble metal salts of the above acids contemplated within this invention include both the light and heavy metals, for example, sodium, lithium, potassium, barium, calcium, strontium, magnesium, zinc, cadmium, copper, iron, lead, chromium, tin, nickel, aluminum, and cobalt salts. Preference is given to the barium and zinc salts, with special preference given to the zinc salts.

The dithiophosphoric acid di-esters described may be prepared by mixing and heating a total of from 3 to 8 moles or preferably about 4 moles of an ethereal alcohol alone or admixture with other ethereal alcohols with about 1 mol of $P_2S_5$ until most of the $P_2S_5$ has reacted and the evolution of $H_2S$ has subsided. This reaction can be carried out under reduced pressure to remove the $H_2S$ from the reaction or it can be carried out at atmospheric pressure. Suitable temperatures for the reaction will lie between ambient temperature and 200° C., with a preference for temperatures from about 50° C. to about 120° C. The time required for completion of the reaction depends upon the temperatures and pressure employed and may vary from 0.5 to 4 hours or more. If desired, an inert solvent may be added to the reaction mixture either before or after the reaction to facilitate handling. The crude product can be decanted or filtered from any unreacted $P_2S_5$ which may in some instances remain.

Metal salts of the above acid compounds may be prepared by simple neutralization of the above product with a suitable salt-forming base or by well-known double decomposition procedures wherein a solution of a monovalent dithiophosphate salt is treated with a salt of a polyvalent metal.

The preparation of symmetrical acids and salts can be accomplished by reaction of a single ethereal alcohol with $P_2S_5$ to produce the symmetrical acid, and forming the salt. Unsymmetrical and/or mixed salts can be prepared by any of the following methods:

(1) Reaction of $P_2S_5$ with a mixture of ethereal alcohols, and subsequently reacting the resulting product with the desired salt-forming reagent;
  (2) First preparing symmetrical acids by the separate reactions of $P_2S_5$ with each of the desired ethereal alcohols; mixing at least two of such symmetrical acids together; and then reacting the mixture with the desired basic reagent to form the complex salt of a polyvalent metal.

The latter preparations can result in the unsymmetrical compounds, symmetrical compounds, and/or mixed compounds.

Preparation of the dithiophosphates of this invention will now be described in greater detail by means of the following examples in which the preparation and effectiveness of some representative compounds are illustrated. All parts are by weight unless otherwise stated. It will be understood that our invention is not limited to the use of these particular compounds since examples are given primarily for purposes of illustration and our invention is to be construed as broadly as the appended claims permit.

EXAMPLE 1

*Preparation of lithium bis-(diisobutenoxy-ethyl) dithiophosphate*

To a stirred mixture of 4650 g. of ethylene glycol and 3665 g. of diisobutenyl chloride [1] at 120° C. was added slowly 1000 g. of sodium hydroxide. The mixture was heated a total of three hours at 120–135° C. at which point the theoretical amount of water had been removed. The resulting mixture was washed twice with 4000-ml. portions of water, then dried at 90° C./20 mm. The residual 2-diisobutenoxy ethanol was a light brown liquid which weighed 3100 g.

[1] Prepared by the chlorination of diisobutylene as given by Umnowa, J. Russian Physical Chemical Society, volume 42, beginning with page 1536.

A mixture of 700 g. of this 2-diisobutenoxy ethanol and 22 g. of phosphorus pentasulfide was heated at 96° C./109 mm. for four hours yielding 827 g. of a cloudy amber, viscous liquid.

To 263 g. of this liquid condensation product was added 12.6 g. of lithium hydroxide monohydrate and 65 ml. of methanol and the whole heated to 100° C./25 mm. To the residue was added 264.9 g. of mineral lubricating oil and a siliceous filter aid. This mixture was filtered and the cloudy filtrate was clarified by the addition of 40 g. of methylcyclohexanol. (A peptizing or solubilizing agent.) The clear solution was found to have the following composition:

Percent sulfur _____ 6.83
Percent phosphorus _____ 3.16
Percent lithium _____ 0.28

EXAMPLE 2

*Preparation of barium bis-(diisobutenoxy-ethyl) dithiophosphate*

To a stirred mixture of 704 g. of the 2-diisobutenoxy ethanol-phosphorus pentasulfide condensation product prepared as indicated in Example 1, and 70 cc. of methanol, there was added 23.1 g. of barium oxide. The resulting mixture was heated at 65–70° C. for 1.5 hours then at 105° C./30 mm. for 1.5 hours. The product was diluted with 163 g. of lauryl alcohol (added to serve as a peptizing or solubilizing agent) treated with a siliceous filter aid and filtered. The filtrate was a yellow, viscous liquid, weighing 835 g., and having the following composition.

Percent sulfur _____ 6.08
Percent phosphorus _____ 3.14
Percent barium _____ 1.86

EXAMPLE 3

*Preparation of zinc bis-(diisobutenoxy ethyl) dithiophosphate*

To 414 g. of the 2-diisobutenoxy ethanol-phosphorus pentasulfide condensation product prepared as described in Example 1, there was added 19 g. of zinc oxide at 25–40° C. over a period of 20 minutes. This mixture was then heated at 60° C. for one hour and finally at 100° C./50 mm. for 30 minutes. The residue was treated with a siliceous filter aid and filtered yielding 310 g. of an oily, orange-brown liquid, which was shown to have the following composition:

Percent sulfur _____ 7.15
Percent phosphorus _____ 2.93
Percent zinc _____ 3.46

EXAMPLE 4

*Preparation of*

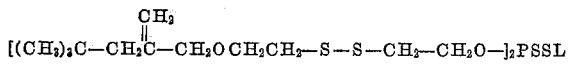

A mixture of 308 g. of bis-(2-hydroxyethyl) disulfide and 883 g. of diisobutenyl chloride [2] was treated portionwise over a period of 30 minutes at 145–155° C. with 80 g. of sodium hydroxide, and then heated for an additional three hours at 150–170° C., at which point the evolution of water had ceased. The cooled mixture was washed three times with water and then dried at 70° C./20 mm. The dried product was filtered yielding 461 g. of a dark brown liquid. Four hundred and twelve grams of this product was mixed with 86.5 g. of phosphorus pentasulfide and heated at 80–90° C. for three hours. The product was treated with a siliceous filter aid and filtered, yielding 320 g. of a brown, slightly viscous liquid.

One hundred and forty grams of this 2-hydroxyethyl diisobutenoxy-ethyl disulfide-phosphorus pentasulfide condensation product was mixed with 5.1 g. of lithium hydroxide monohydrate and heated for two hours at 60° C., then for 1.5 hours at 100° C./30 mm. The residue was treated with a siliceous filter aid and filtered, yielding 117 g. of a dark, slightly viscous liquid which was shown to have the following composition.

Percent sulfur _____ 28.2
Percent phosphorus _____ 4.76
Percent lithium _____ 0.41

EXAMPLE 5

*Preparation of*

One hundred and forty seven grams of the 2-hydroxyethyl diisobutenoxy-ethyl disulfide-phosphorus pentasulfide condensation product described in Example 4 was mixed with 5.3 g. of zinc oxide and 15 cc. of methanol and heated at 60° C. for two hours. The product was dried at 100° C./30 mm. for 1.5 hours, treated with a siliceous filter aid and filtered. The filtrate was a dark, non-viscous liquid, which weight was 62 g. and was shown to have the following composition.

Percent phosphorus _____ 2.46
Percent zinc _____ 0.45

EXAMPLE 6

*Preparation of barium bis-(triisobutenoxy-ethyl) dithiophosphate*

A mixture of 810 g. of triisobutenyl chloride[3] and 743 g. of ethylene glycol was treated portionwise over a period of 30 minutes at 130–140° C., at which point the theoretical amount of water had been removed. The cooled mixture was treated with sufficient (700 cc.) of water to dissolve the sodium chloride, and the resultant oil layer was separated, washed three times with water and fractionated. A fraction boiling at 119–144°/7–8 mm. and weighing 300 g. was collected as 2-triisobutenoxy ethanol.

A mixture of 286 g. of this 2-triisobutenoxy ethanol and 286 g. of mineral lubricating oil was treated at 100–105° C. The oily liquid product weighed 614 g.

To a mixture of 291 g. of this 2-triisobutenoxy ethanol-phosphorus pentasulfide condensation product and 30 cc. of methanol there was added over a 5-minute period 20 g. of barium oxide. This mixture was heated at 60° C. for one hour, then at 100° C./25 mm. for 30 minutes. The residue was treated with a siliceous filter aid and filtered, yielding 291 g. of a viscous, brown liquid which was shown to have the following composition:

Percent sulfur _____ 5.81
Percent phosphorus _____ 2.72
Percent barium _____ 5.53

EXAMPLE 7

*Preparation of lithium bis-(triisobutenoxy-ethyl) dithiophosphate*

A mixture of 401 g. of the 2-triisobutenoxy ethanol-phosphorus pentasulfide condensation product prepared as in Example 6, 40 cc. of methanol and 11.65 g. of lithium hydroxide monohydrate was heated at 65–70° C. for 1.5 hours, then at 100° C./27 mm. for 1.5 hours. The cooled mixture was treated with a siliceous filter aid and filtered, yielding 315 g. of a light brown, viscous liquid which was shown to have the following composition:

Percent sulfur _____ 6.86
Percent phosphorus _____ 3.55
Percent lithium _____ 0.51

---

[2] Prepared by the method given in Example 1.

[3] Prepared by same method given in Example 1, except triisobutylene was used.

EXAMPLE 8

*Preparation of zinc bis-(triisobutenoxy-ethyl) dithiophosphate*

A mixture of 422 g. of the 2-triisobutenoxy ethanol-phosphorus pentasulfide condensation product, prepared as indicated in Example 6, 42 cc. of methanol and 11.8 g. of zinc oxide was heated at 65–70° C. for 1.5 hours, and then at 100° C./12 mm. for 1.5 hours. The residue was treated with a siliceous filter aid and filtered, yielding 378 g. of a brown, viscous liquid which was shown to have the following composition:

Percent sulfur _____ 7.81
Percent phosphorus _____ 3.84
Percent zinc _____ 2.12

EXAMPLE 9

*Preparation of barium bis-[bis-(diisobutenoxy) propyl] dithiophosphate*

A mixture of 1380 g. of glycerol and 1465 g. of diisobutenyl chloride[4] was heated with stirring at 130–150° C. while 400 g. of sodium hydroxide was added slowly. The resulting mixture was heated at 150–170° C. for an additional six hours. On cooling two layers separated; the top was washed with saturated salt solution to remove glycerol; the bottom layer was treated with sufficient water to dissolve the sodium chloride and the resulting oil layer was combined with the washed top layer. These combined fractions were distilled to yield 446 g. of bis-(diisobutenoxy) propanol.

To 312 g. of this product at 100° C. was added 55.5 g. of phosphorus pentasulfide over a period of 15 minutes. The mixture was heated at 100° C. for an additional two hours, then filtered. The filtrate was diluted with 335 g. of mineral lubricating oil yielding 670 g. of a light brown oil. A mixture of 300 g. of this product, 6.4 g. of barium oxide and 30 cc. of methanol was heated at 60° C. for one hour, then at 100° C./50 mm. The mixture was filtered; the filtrate was a light brown syrupy liquid which was shown to have the following composition:

Percent sulfur _____ 4.12
Percent phosphorus _____ 1.94
Percent barium _____ 1.64

EXAMPLE 10

*Preparation of zinc bis-[bis-(diisobutenoxy) propyl] dithiophosphate*

A mixture of 300 g. of the bis-(diisobutenoxy) propanol-phosphorus pentasulfide reaction product prepared as in Example 9, 3.4 g. of zinc oxide and 30 cc. of methanol was heated at 60–70° C. for one hour, then at 100° C./5 mm. The residue was filtered, yielding 296 g. of a light brown, oily liquid filtrate which was shown to have the following composition:

Percent sulfur _____ 4.27
Percent phosphorus _____ 1.98
Percent zinc _____ 0.81

EXAMPLE 11

*Preparation of sodium bis-[bis-(diisobutenoxy)propyl] dithiophosphate*

To a stirred mixture of 150 g. of bis-(diisobutenoxy) propanol, prepared as in Example 9, and 250 ml. of benzene at 70° C. was added 29.3 g. of phosphorus pentasulfide over a period of 30 minutes. The mixture was heated at 80–85° C. for an additional four hours, whereupon the benzene was removed at 60° C./30 mm. leaving 178 g. of residue. This was treated with 540 g. of water and 3.0 g. of sodium hydroxide at 60–80° C. for 30 minutes yielding a white milky emulsion which was shown to have the following composition:

Percent sulfur _____ 2.48
Percent phosphorus _____ 1.12
Percent sodium _____ 0.34

If a water-free product is desired, the water may be replaced by 30 ml. of methanol and the product thereafter heated to about 100° C. under reduced pressure. The product made in such manner is soluble in mineral lubricating oils.

EXAMPLE 12

*Preparation of barium salt of a dithiophosphoric acid prepared from a $C_{12}$ ether-alcohol*

A mixture of 187 g. of a $C_{12}$ ethereal alcohol (a Sharpless Chemical Co. cample, EC 2481, purported to contain a hydroxyl group, ether linkages, and a petroleum hydrocarbon portion containing 12 carbon atoms), 22.3 g. of phosphorous pentasulfide and 187 g. of mineral lubricating oil was heated at 90–96° C. for 1.5 hours, then treated with 46.7 g. of methylcyclohexanol (serving as a peptizing or solubilizing agent). The product was a yellow oily liquid which weighed 442 g.

A mixture of 426 g. of this material, 22.1 g. of barium hydroxide and 20 cc. of methanol was heated with stirring at 60° C. for one hour, then at 70° C. for one hour and finally at 95° C./13 mm. The product was treated with a siliceous filter acid and filtered. The filtrate was treated with 25 g. of methylcyclohexanol. The resulting green liquid weighed 364 g. and was shown to have the following composition:

Percent sulfur _____ 4.90
Percent phosphorus _____ 1.31
Percent barium _____ 3.19

EXAMPLE 13

*Preparation of zinc bis-(2-diisobutoxy-ethyl) dithiophosphate*

Fifty grams of 2-diisobutoxy-ethanol (made by hydrogenating 2-diisobutenoxy-ethanol at 200° C. and 1950 pounds per square inch (the 2-diisobutenoxy-ethanol was obtained by the process shown by Example 1)) was stirred in a reaction vessel and 12.7 grams of $P_2S_5$ was added keeping the temperature below 21° C. during the addition thereof. After all of the $P_2S_5$ had been introduced, the whole was stirred for one hour at 96° C. under reduced pressure (87 mm. Hg absolute). The contents of the vessel were then removed and filtered, yielding 56 grams of a dark green liquid. The filtrate, found to have an acid number of 98, constitutes substantially pure bis-(2-diisobutoxy-ethyl) dithiophosphoric acid.

Fifty-four grams of the aforesaid dithiophosphoric acid diester was stirred with 4.4 grams of zinc oxide (a 15% excess) for one hour at 60° C. and for 0.75 hour at 100° C. under reduced pressure (87 mm. Hg absolute). 57 grams of a low viscosity solvent-extracted mineral oil was added to the reaction and the whole was filtered, yielding 102 grams of a clear yellow liquid.

The filtrate constitutes a 50% solution of substantially pure zinc bis-(2-diisobutoxy-ethyl) dithiophosphate in mineral oil. It was found to have the following analyses:

Percent sulfur _____ 5.60
Percent phosphorus _____ 2.51
Percent zinc _____ 2.82

EXAMPLE 14

*Preparation of calcium bis-(2-diisobutoxy-ethyl) dithiophosphate*

One hundred and six grams of bis-(2-diisobutoxy-ethyl) dithiophosphoric acid, prepared in the same man- ---
[4] Prepared by the method given in Example 1.

ner set forth in example 13, was admixed with 10 ml. of methanol and 8.1 grams (a 20% excess) of calcium hydroxide. The reaction mass was stirred for one hour at 60° C. and 0.5 hour at 100° C. under reduced pressure (79 mm. Hg absolute). 109.6 grams of a low viscosity solvent-extracted mineral oil was added and the whole was filtered, yielding 194 grams of an amber colored liquid.

The filtrate constitutes a 50% solution of substantially pure calcium bis-(2-diisobutoxy-ethyl) dithiophosphate in mineral oil. It was found to have the following analyses:

Percent sulfur _____ 5.46
Percent phosphorus _____ 2.85
Percent calcium _____ 1.69

EXAMPLE 15

*Preparation of barium bis-(2-diisobutoxy-ethyl) dithiophosphate*

One hundred and thirty grams of bis-(2-diisobutoxyethyl) dithiophosphoric acid, prepared in the same manner set forth in Example 13, was admixed with 15 ml. of methanol and 20.1 grams (a 15% excess) of barium oxide. The reactants were stirred together for one hour at 60° C. and 0.5 hour at 100° C. under reduced pressure (79 mm. Hg absolute). 145.9 grams of a low-viscosity solvent-extracted mineral oil was added, the whole was filtered, yielding 253 grams of a green liquid.

The filtered product consists of a 50% solution of substantially pure barium bis-(2-diisobutoxy-ethyl) dithiophosphate in oil. The following analyses were determined:

Percent sulfur _____ 4.61
Percent phosphorus _____ 2.67
Percent barium _____ 4.92

EXAMPLE 16

*Preparation of bis-(sulfurized 2-diisobutenoxy-ethyl) dithiophosphoric acid*

Two thousand and sixty-four grams of 2-diisobutenoxyethanol, prepared by the process disclosed in Example 1, was admixed with 384 grams of sulfur flowers (sufficient to satisfy the unsaturation in the ether-alcohol) and the whole was heated for 4 hours at 160° C. Filtration of the reaction mass yielding 2400 grams of a syrupy, deep-red liquid possessing 13.5% sulfur.

812 grams of the aforesaid sulfurized 2-diisobutenoxyethanol was heated with 22 grams of $P_2S_5$ for 4 hours at 100° C. yielding 990 grams of a deep red liquid, substantially pure bis-(sulfurized 2-diisobutenoxy-ethyl) dithiophosphoric acid. It was found to have the following analyses:

Percent sulfur _____ 26.6
Percent phosphorus _____ 6.65
Acid number _____ 68.7

EXAMPLE 17

*Preparation of the barium salt of bis-(sulfurized-2-diisobutenoxy-ethyl) dithiophosphoric acid*

350 grams of the above dithiophosphoric acid diester was admixed with 36.1 grams (a 10% excess) of barium oxide, 18 ml. of methanol, and 75.8 grams of methylcyclohexanol (added to serve as a solubilizing; i.e., peptizing agent). The whole was stirred for one hour at 60° C. and 0.5 hour at 100° C. under reduced pressure (50 mm. Hg absolute pressure). 303.2 grams of a low viscosity solvent-extracted mineral oil were added and the mass was filtered, yielding 690 grams of a clear, deep red liquid.

The filtered product constitutes a 50% solution of substantially pure barium salt of bis-(sulfurized 2-diisobutenoxy-ethyl) dithiophosphoric acid in oil and methylcyclohexanol. It was found to have the following analyses:

Percent sulfur _____ 12.3
Percent phosphorus _____ 2.33
Percent barium _____ 2.40

EXAMPLE 18

*Preparation of zinc salt of bis-(sulfurized 2-diisobutenoxyethyl) dithiophosphoric acid*

Three hundred and fifty grams of bis-(sulfurized 2-diisobutenoxy-ethyl) dithiophosphoric acid, whose preparation is set forth in Example 16, was admixed with 19.2 grams of zinc oxide (a 10% excess) and 15 ml. of methanol. The reaction mass was stirred for one hour at 60° C., then for 0.5 hour at 100° C. under reduced pressure (25 mm. Hg absolute pressure). Therafter, 367 grams of a low viscosity, solvent-extracted mineral oil and 73.4 grams of methyl-cyclohexanol (peptizing agent) were added and the whole was filtered, yielding 652 grams of an oily, red liquid, consisting of a 41.7% solution of substantially pure zinc salt of bis-(sulfurized 2-diisobutenoxy-ethyl) dithiophosphoric acid in oil and methyl-cyclohexanol. It was found to have the following analyses:

Percent sulfur _____ 9.7
Percent phosphorus _____ 1.24
Percent zinc _____ 0.52

EXAMPLE 19

*Preparation of lithium salt of bis-(sulfurized 2-diisobutenoxy-ethyl) dithiophosphoric acid*

Three hundred and thirteen grams of bis-(sulfurized 2-diisobutenoxy-ethyl) dithiophosphoric acid was admixed with 13.2 grams of lithium mono-hydrate and 78 ml. of methanol. The mass was stirred for one hour at 60° C. and then for 0.5 hour at 100° C. under reduced pressure (28 mm. Hg absolute).

315 grams of a low viscosity solvent-extracted mineral oil and 141.5 grams of methyl-cyclohexanol (peptizing agent) were added and the whole was filtered, yielding 586 grams of a red liquid.

The filtrate constitutes a 40% solution of substantially pure lithium salt of bis-(sulfurized 2-diisobutenoxyethyl) dithiophosphoric acid in oil and methyl-cyclohexanol. It was found to have the following analyses:

Percent sulfur _____ 10.2
Percent phosphorus _____ 2.08
Percent lithium _____ 0.22

EXAMPLE 20

*Preparation of cobaltous bis-(2-diisobutoxyethyl) dithiophosphate*

Three hundred and forty-one grams of bis-(2-diisobutoxy-ethyl) dithiophosphoric acid (cf. Example 13 for preparation) was admixed with 39.1 grams of cobaltous carbonate (a 5% excess) and 68 ml. of a mixture of equal parts by volume of water and methanol. The reaction mass was stirred for 1.5 hours at 80°–85° C. and then for 1.5 hours at 120° C. under reduced pressure (37 mm. Hg absolute).

359.4 grams of a low viscosity, solvent-extracted mineral oil was added and the whole was filtered, yielding 605 grams of a brown liquid. The filtrate consists of a 50% solution of substantially pure cobaltous bis-(2-diisobutoxy-ethyl) dithiophosphate in oil. The following analyses were determined:

Percent sulfur _____ 5.31
Percent phosphorus _____ 2.61
Percent cobalt _____ 2.15

The product prepared as thus described may be added directly to lubricating oils. These compounds act as inhibitors, detergents, film strength improvement agents, etc. Ordinarily, only a small proportion of the dithiophosphates of this invention is necessary in a lubricating oil to impart to the oil the representative characteristics desired. Other addition agents may be also employed in the lubricating oils since the dithiophosphates of this invention do not act contrary to the effects of other additives.

While the ether-bearing dithiophosphates of the present invention are useful per se as improving agents for lubricating compositions, especially mineral lubricating oils intended for use in the crankcases of internal combustion engines, they are most advantageously employed in combination with one or more additional improving agents of the prior art such as; e.g., the numerous prior art oxidation inhibitors, detergents, extreme-pressure agents, rust inhibitors, and oiliness agents.

In addition to the above-named cooperating improving agents, the present invention also contemplates the inclusion, in the finished lubricant, of materials intended to modify the physical characteristics of the mineral lubricating oil base. Examples of such materials are foam inhibitors, pour depressants, viscosity index improving agents, and odor improving agents. Since the types of materials useful as physical property improving agents are well-known to those versed in the lubricant art, it is deemed unnecessary to lengthen the present specification unduly by a recitation of the same.

Particularly effective lubricating oils for the crankcases of internal combustion engines can be made by incorporating, in suitable mineral lubricating oil bases, in combination with the ether-bearing dithiophosphates of the present invention, the oil-soluble metal salts of petroleum sulfonic acids (generally known in the art as "mahogany acids"), and/or phosphorus sulfide treated unsaturated organic materials.

The metal salts of petroleum sulfonic acids can be the light and heavy metal salts with special preference given to the alkaline earth metal salts. The metal salts of petroleum sulfonic acids can be the overbased type or metal complexes disclosed in co-pending applications Ser. No. 216,101, filed March 16, 1951; Ser. No. 216,102, filed March 16, 1951; Ser. No. 216,103, filed March 16, 1951; Ser. No. 224,458, filed May 5, 1951; Ser. No. 263,961, filed December 28, 1951; Ser. No. 263,962, filed December 28, 1951; Ser. No. 263,963, filed December 28, 1951; Serial No. 276,462, filed March 13, 1952; and Serial No. 279,258, filed March 28, 1952.

In lieu of the mahogany sulfonates or in admixture therewith, other oil-soluble sulfonates, may be used such as; e.g., metal sulfonates of alkylated naphthalenes, alkylated benzenes, alkylated phenols, and the like, such as can be found in the prior art. Usually however, the "mahogany" sulfonates are preferred for reasons of their availability and excellence.

Phosphorus sulfide treated unsaturated organic materials useful in conjunction with the ether-bearing dithiophosphates of the present invention include; e.g., phosphorus sulfide treated acyclic and cyclic unsaturated hydrocarbons and phosphorus sulfide treated unsaturated esters, acids, and ketones and particularly phosphorus sulfide-treated terpene hydrocarbons. Such phosphorus sulfide-treated materials may be modified by treatment with reagents such as water, alcohols, phenols, or metallic bases to yield end-products having enhanced utility for certain applications. Additional information on the preparation and uses of such co-operating improving agents may be had by reference to U.S. Patents 2,278,719; 2,315,529; 2,316,078; 2,316,079; 3,316,080; 2,316,084; 2,316,089; 2,331,923; 2,356,073; 2,356,074; 2,367,468; 2,375,315; 2,377,955; 2,379,312; 2,379,313; 2,383,494; 2,383,495; 2,383,498; 2,392,252; 2,392,253; 2,406,575; 2,409,877; 2,409,878; 2,416,281; and 2,421,631.

One of the most useful of such phosphorus sulfide treated unsaturated organic materials for use in combination with the ether-bearing dithiophosphates of the present invention is phosphorus pentasulfide treated pinene. The pinene may either be the alpha or beta form or a commercial mixture thereof known in the art as turpentine. Such product may be made by reacting from 3 to 6 moles of pinen, preferably 4 or 5 moles thereof, with 1 mole of phosphorus pentasulfide for a period of from 2 to 5 hours at about 130° to 150° C. Since the product is of a viscous nature, it is convenient to add a proportion of a low viscosity mineral oil either prior to reaction or after the product has been formed as to obtain a fully fluid material which can be handled with ease.

In addition to phosphorus sulfide treated unsaturated organic materials and oil-soluble metal sulfonates, which products have been found to be of particular utility for use in conjunction with the ether-bearing dithiophosphates of the present invention in preparing improved lubricants, it is also contemplated to use various other prior art improving agents along with my ether-bearing dithiophosphates. Many examples of such useful prior art detergents, corrosion inhibitors, and oxidation inhibitors which may be used advantageously in combination with my ether-bearing dithiophosphates may be found in articles V. A. Kalichevsky (Petroleum Refiner, volume 28, No. 9, pages 88–93 inclusive, September 1949) and U. Harold Byers (National Petroleum News, February 10, 1939, pages 67–70 inclusive). In the interest of not lengthening the present specification unduly, it is intended that the improving agents therein disclosed be considered as forming a part of our disclosure.

The additives to be employed in the lubricating oils are preferably used in the following proportions:

| Additive | Broad range, percent | Intermediate range, percent | Preferred range, percent |
| --- | --- | --- | --- |
| The dithiophosphate of this invention | 0.1 to 5 | 0.2 to 2 | 0.3 to 1 |
| Polyvalent salt of oil-soluble sulfonic acid (preferably mahogany acids) | 0.05 to 10 | 0.05 to 2 | 0.1 to 1 |
| Other additives | 0.01 to 10 | 0.03 to 5 | 0.05 to 1 |

The dithiophosphate di-esters of this invention preferably contain at least one ester radical of at least 6 carbon atoms and most desirably of at least 8 carbon atoms. The combined total of carbon atoms in the dithiophosphate di-ester molecule is preferably at least 12 per an atom of phosphorus. Compounds of these types have been found soluble and stable in lubricating oils.

Various examples of the dithiophosphates of the present invention were tested to determine their desirability in lubricating compositions. These tests are presented below. The components of the compositions in all the tests are given in percentage proportions by weight.

OXYACID DETERGENCY TEST

This test determines the ability of the detergent to prevent lacquer formation on a metal strip placed in a 0.6% oxyacid dispersion. The surface of the metal affects the results of the test. Steel surfaces form more lacquer than aluminum alloy surfaces. Steps of the procedure:

Step 1.—Place 40 cc. of the chosen lubricant (prepared in Pennsylvania, 150 neutral oil) in an 8 inch test tube. Add 0.2 gram of oxyacid. The oxyacid is prepared according to the directions given by Denison and Clayton (SAE Journal, vol. 53, page 265T, 1945).

Step 2.—Stir sample for two minutes at 2,000 r.p.m.

Step 3.—A metal strip 1.5 inches by 3/8 inch, polished with emery paper is added. (SAE 1015 steel was used in the actual tests given below.)

Step 4.—The test tube containing the lubricant sample is placed in a 400 cc. beaker, the strip being inclined at an angle of about 45 degrees to the vertical.

*Step 5.*—This is placed in an oven and maintained within ±1° C. of the test temperature. Test temperatures may be selected from the range 25°, 60°, 80°, 100°, 120°, 160°, 200° C.

*Step 6.*—Test duration is set at four hours.

*Step 7.*—The strips are removed, washed with petroleum ether, and dried.

*Step 8.*—The detergent was rated by observing the amount of lacquer contained on the strip and correlating this with the percentage of additive present in the lubricant. The rating on a 1% concentration of additive is 1 if the metal strip is covered over no more than about 1/10 of its surface with lacquer. If 2% of the additive is required to hold lacquer formation to the specified amount as indicated above, the rating is 2. If 3% of the additive is required in similar fashion the rating is 3, and so on up.

OXYACID DETERGENCY TEST RESULTS

| Ex. | Lubricant | Temperature, °C. | Rating No. |
|---|---|---|---|
| 21 | Conventionally refined Pennsylvania neutral oil having a viscosity of about 150 Saybolt universal seconds at 100° F. Zinc salt of bis-(diisobutoxy ethyl) dithiophosphoric acid. | 160<br>120 | 3<br>5 |
| 22 | Conventionally refined Pennsylvania neutral oil having a viscosity of about 150 Saybolt universal seconds at 100° F. Barium salt of bis-(diisobutoxy ethyl) dithiophosphoric acid. | 160<br>120 | 5<br>5 |
| 23 | Conventionally refined Pennsylvania neutral oil having a viscosity of about 150 Saybolt universal seconds. Calcium salt of bis-(diisobutoxy ethyl) dithiophosphoric acid. | 160<br>120 | 5<br>5 |

|  | °F. |
|---|---|
| Coolant temperature | 345 |
| Oil temperature | 225 |
| Air-fuel ratio | 12.7:1 |

The engine was stopped at 30 hour period for inspection of piston, piston skirt, piston rings, connecting rod bearings, etc. The engine was equipped with removable connecting-rod bearings consisting of lead-bronze with a steel backing. These bearings were weighed at the beginning of the test and at each 30 hour inspection period. Before each new test, the engine was thoroughly cleaned and equipped with new piston, piston rings and with new connecting rod bearings.

As the test continued the lubricant level in the crankcase was kept substantially constant by the addition of fresh lubricant, if necessary, every 10 hours. The test was a maximum duration of 240 hours, with an inspection performed every 30 hours usually beginning at either 30 or 60 hours. The inspection entails the removal of the piston and connecting rod bearing for an examination of the following items:

(1) Piston cleanliness (alphabetical ratings range from "A" for a perfectly clean piston to "E" for one which is very heavily coated with deposits)

(2) Number of rings stuck (3) Percent filling of oil ring groove (4) Weight loss of bearing in milligrams. If ring sticking, heavy piston deposits, or excessive bearing corrosion are noted, at any inspection period, the test is discontinued.

The following test results show the beneficial effect produced by using the ether-bearing dithiophosphates of my invention:

LAUSON ENGINE TEST RESULTS

| Ex. | Lubricant | Hours | Piston | Rings stuck | Percent ring filling | Milligrams bearing loss |
|---|---|---|---|---|---|---|
| 24 | Mid-Continent solvent extracted SAE 30 motor oil, 1.0% calcium mahogany sulfonate, 0.8% zinc salt of bis-(diisobutoxy ethyl) dithiophosphoric acid. | 30<br>60<br>90<br>120<br>150<br>180<br>210<br>240 | A<br>B<br>AB<br>AB<br>B<br>C<br>C<br>CD | 0<br>0<br>0<br>0<br>0<br>0<br>0<br>0 | 0<br>0<br>5<br>5<br>10<br>20<br>80<br>70 | 12<br>21<br>29<br>41<br>69<br>79<br>88<br>98 |
| 25 | Mid-Continent solvent extracted SAE 30 motor oil, 0.96% barium mahogany sulfonate, 0.3% reaction product of turpentine with P₂S₅, 0.83% barium salt of bis-(diisobutoxy ethyl) dithiophosphoric acid. | 30<br>60<br>90<br>120<br>150<br>180<br>210<br>240 | A<br>BC<br>A<br>AB<br>A<br>B<br>B<br>B | 0<br>0<br>0<br>0<br>0<br>0<br>0<br>0 | 0<br>0<br>5<br>20<br>80<br>75<br>75<br>95 | 20<br>23<br>25<br>35<br>43<br>48<br>57<br>66 |
| 26 | Pennsylvania solvent extracted SAE 30 oil, 1.0% zinc bis-(diisobutenoxy ethyl) dithiophosphate. | 60<br>90<br>120<br>150 | B<br>C<br>C<br>C | 0<br>0<br>0<br>0 | 5<br>10<br>5<br>20 | 8<br>12<br>34<br>124 |
| 27 | Mid-Continent solvent extracted SAE 30 oil, 1.0% barium bis-[bis-(diisobutenoxy) propyl] dithiophosphate. | 60<br>90<br>120<br>150 | B<br>B<br>BC<br>C | 0<br>0<br>0<br>1 | 0<br>0<br>0<br>0 | 13<br>18<br>33<br>116 |
| 28 | Mid-Continent solvent extracted SAE motor oil (control) | 60 | D | 1 | 15 | 404 |
| 29 | Pennsylvania solvent extracted SAE 30 motor oil (control) | 60 | E | 2 | 100 | 664 |

LAUSON ENGINE TEST

In this test lubricating compositions were tested by means of a 2½ H.P. single cylinder liquid cooled 4-cylinder gasoline engine rated at 1,800 r.p.m. The procedure used was as follows:

The engine was loaded by means of a fan type brake which applied a load of 1½ H.P. at 1600 r.p.m. The engine was run for ten minutes at 1200 r.p.m. and then the speed was increased to 1600 r.p.m. The following conditions were maintained constant during the remainder of the test—

This application is a continuation-in-part of Serial No. 250,959, filed October 10, 1951, now abandoned and Serial No. 314,745, filed October 14, 1952 now abandoned.

The ether containing esters of dithiophosphoric acids, and salts thereof, of this invention can be employed as improving agents in lubricating oils and greases, and particularly for such purposes as producing improved lubricants for use in crankcases of internal combustion jet aviation devices, top cylinder regions, steam cylinders, steam locomotives, railway cars, gas engines, refrigerating machines, and hydraulic, compressor, turbine, spindle, and torque converter mechanisms. Other suitable uses are in asphalt emulsions, insecticidal compositions, fireproofing and stabilizing agents in plasticizers and plastics, paint driers, rust inhibiting compositions, pesticides, foaming compositions, cutting oils, metal drawing compositions, flushing oils, textile treatment compositions, tanning assistants, metal cleaning compositions, emulsifying agents, antiseptic cleansing compositions, penetrating agents, gum solvent compositions, fat splitting agents, flotation agents, and improving agents for hydrocarbon fuels, etc.

Other modes of applying the principle of the invention may be employed, change being made as regards the details described, provided the features stated in any of the following claims, or the equivalent of such, be employed.

I therefore particularly point out and distinctly claim as my invention:

1. The oil-soluble dithiophosphates having the structure:

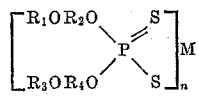

where $n$ represents the valency of M, M is a metal, $R_1$ and $R_3$ are radicals having at least six carbon atoms selected from the class consisting of alkyl, alkenyl, cycloalkyl, lower alkyl-substituted cycloalkyl, sulfurized alkenyl, saturated aliphatic hydrocarbon ethers and saturated aliphatic hydrocarbon thioethers, and $R_2$ and $R_4$ are selected from the class consisting of alkylene radicals and alkenoxy-substitued alkylene radicals.

2. The compounds of claim 1 further characterized in that $R_1$ and $R_3$ are saturated radicals.

3. The compounds of claim 1 further characterized in that $R_1$ and $R_3$ are saturated hydrocarbon radicals.

4. The compounds of claim 1 further characterized in that $R_1$ and $R_3$ are saturated sulfur-bearing radicals.

5. The compounds of claim 1 further characterized in that $R_1$ and $R_3$ are unsaturated radicals.

6. The compounds of claim 1 further characterized in that $R_1$ and $R_3$ are unsaturated hydrocarbon radicals.

References Cited in the file of this patent

UNITED STATES PATENTS

| | | |
|---|---|---|
| 1,893,018 | Christmann | Jan. 3, 1933 |
| 2,343,213 | Ashley | Feb. 29, 1944 |
| 2,369,632 | Cook | Feb. 13, 1945 |
| 2,579,037 | Evans et al. | Dec. 18, 1951 |
| 2,579,038 | Evans et al. | Dec. 18, 1951 |
| 2,585,813 | McDermott | Feb. 12, 1952 |

FOREIGN PATENTS

| | | |
|---|---|---|
| 658,182 | Great Britain | Oct. 3, 1951 |
| 976,343 | France | Oct. 25, 1950 |